United States Patent [19]

Antal et al.

[11] Patent Number: 4,489,021

[45] Date of Patent: Dec. 18, 1984

[54] PROCESS FOR MANUFACTURING LARGE-LENGTH AND LARGE-DIAMETER HOSES

[75] Inventors: Sándor Antal; Péter Smaroglay; Elemér Lantos, all of Budapest, Hungary

[73] Assignee: Taurus Gumiipari Vàllalat, Budapest, Hungary

[21] Appl. No.: 412,450

[22] Filed: Aug. 27, 1982

[30] Foreign Application Priority Data

Sep. 3, 1981 [HU] Hungary .............................. 2252/81

[51] Int. Cl.³ .............................................. B29H 5/01
[52] U.S. Cl. ......................................... 264/27; 156/149;
156/273.9; 264/173; 264/236; 264/347;
425/174.6; 425/392; 425/445
[58] Field of Search .................... 264/25, 27, 173, 236,
264/347; 425/174.6, 392, 445; 156/273.9, 149

[56] References Cited

U.S. PATENT DOCUMENTS

| 1,037,187 | 9/1912 | Adamson | 425/392 |
|---|---|---|---|
| 1,602,579 | 10/1926 | Ives | 264/27 |
| 2,758,366 | 8/1956 | Voetelink | 264/25 |
| 3,045,281 | 7/1962 | Skobel | 425/174.6 |
| 3,784,732 | 1/1974 | Whitfill, Jr. | 264/27 |
| 4,019,939 | 4/1977 | Barbier et al. | 264/236 |
| 4,131,409 | 12/1978 | Babbin | 425/392 |
| 4,155,790 | 5/1979 | Galloway | 264/347 |
| 4,199,542 | 4/1980 | Taylor | 264/347 |

FOREIGN PATENT DOCUMENTS

| 154707 | 11/1968 | Hungary . | |
|---|---|---|---|
| 49-27671 | 7/1974 | Japan | 264/27 |
| 51-61579 | 5/1976 | Japan | 264/236 |
| 52-30185 | 8/1977 | Japan | 264/347 |
| 53-119983 | 10/1978 | Japan | 425/392 |
| 1437946 | 7/1973 | United Kingdom | 264/27 |
| 1526589 | 9/1978 | United Kingdom | 264/347 |

Primary Examiner—Jeffery Thurlow
Attorney, Agent, or Firm—Gabriel P. Katona

[57] ABSTRACT

There is disclosed a process for manufacturing large-diameter, large-length hoses. The process is characterized by applying the elements required for building the hoses onto a flexible foundation lead through an advancing or through an advancing and rotating movement of same while conveying the hose along a curved course, the track of the course having the shape of a preferably closed curve, and by vulcanizing the built up hose preferably by applying electric energy.

3 Claims, 5 Drawing Figures

PROCESS FOR MANUFACTURING LARGE-LENGTH AND LARGE-DIAMETER HOSES

BACKGROUND

This invention relates to a process for manufacturing large-length and large-diameter hoses.

In the present specification the term "large-diameter hoses" refers to hoses having a diameter ranging from 50 mm to 1000 mm, and the term "large-length hoses" applies to those being longer than 50 m.

It is known, that the raw materials of the elastomer layers of large-diameter, large-length hoses may be any flexible materials; the materials may be both thermoplastic or also thermosetting ones. The most valuable hose-manufacturing processes are those enabling the application of both thermoplastic and thermosetting materials. Of limited value are processes enabling only the application of materials of one definite type.

Hose manufacturing processes which are known, are suitable for producing large-diameter hoses at lengths ranging up to 50 m. Likewise processes are known by which hoses of no more than 50 mm diameter can be produced in lengths of 50–200 m.

No process is however known by which hoses of 50–1000 mm diameter with lengths over 50 m can be made of any elastomer or plastomer or more than one type.

Various methods have been developed for manufacturing large-length hoses having at least 50 mm diameter. Building a hose usually starts with a tube extruded on flexible mandrel let off drums rotating around a horizontal axis; on this mandrel are applied the reinforcing plies with twisting or braiding from around the longitudinal axis rotating machine having discs. Subsequently after having applied the cover, during cure in a lead-press, the built-up hoses are provided with a pressure-securing casing. The semifinished product thus obtained is wound on a drum rotating around a horizontal axle and subsequently, the hose is wrapped with a lead-sheath and is cured in a large-diameter steam boiler. After cure the flexible mandrel is removed by using hot water; while the lead-sheath is removed by conventional appropriate equipment.

The above process can not be used for the manufacture of large diameter hoses, because with larger diameter flexible mandrels the bending radius increases and due to this, drums of unworkable dimensions would be needed. An additional problem arises in that no machines suitable for extruding tubes or covers for the large-diameter hoses are available. Several hundred, perhaps thousand yarns would have to be simultaneously applied, the known braiding or twisting machines suitable for applying such yarns have, however, no more than 64 spools. There exists, as a practical matter no equipment for applying simultaneously several hundred yarns.

There are several patents disclosing methods for producing large-diameter hoses up to 50 m long. Representative are U.S. Pat. No. 3,037,343 and Hungarian Pat. No. 154,707.

According to the processes disclosed in these patents the reinforcing plies are applied from braked let off stands onto the mandrel rotated and moved lengthwise by a suitable device. The production of larger length hoses is not possible in this way, because for that purpose, production workshops of several hundred meters length need to be available, and suitable, special apparatus would be necessary for supporting the hoses of large-length during manufacture.

An exception is, to a certain extent, the method disclosed in U.S. Pat. No. 4,019,539 with regard to the above disadvantages. This process, however, is also limited in that it can only be used for the production of thermoplastic, and thus, of plastic hoses that require no curing. The process can be used for the production of hoses that are several hundred meters long having, a diameter no more than 400 mm at the best. Such a dimension range also requires use of extraordinary large and expensive apparatus. For example the diameter of the drums used when building such a hose is 10 m. Moving drums of this size can only be performed by using very expensive equipment. Hoses manufactured by using the process disclosed in the patent can only be stored and transported on drums of similar size to that of the manufacturing drums. Therefore, such a plant can only be set up on a seaside and the hoses can only be sold to customers having a seaport or dock who intend to use said hoses in the port or on floating equipment. This is so because drums having a diameter of about 10 m can not be transported on highways or on railways.

The known processes can be used with thermoplastics, for example in the case of applying a Rilsan type polyamide as a plastomer only, while hoses made of materials requiring vulcanization can not be fabricated by using this process.

Another known process the production of large-diameter hoses having a length of 50 m, uses a large size turn-bench with building-up. Building of the individual structural elements onto the rotating mandrel is carried out by means of a servizer moving along the machine.

Recently, customers increasingly require large-length, large-diameter hoses made of rubber or of a combination of rubber and plastics. However, there is no satisfactory process for manufacturing such hoses. An object of the present invention is to provide a process for producing large-diameter, large-length hoses which cannot be manufactured by using prior art techniques.

BRIEF DESCRIPTION OF THE INVENTION

We have found that the use of large-diameter, heavy-weight, hardly movable drums can be dispensed with when the hoses are advanced along a curved course during building, i.e. during manufacture. The shape of the curved course can be selected depending on the length of the building structure available, and on the length of the hoses to be produced. While the curved course can be of any suitable shaped closed curve, the preferred shape that of a stretched "0". A course of such a shape facilitates the use of a bending radius which does not impair the hose structure being manufactured. The curved shape of the course used for hose manufacturing, possibly led in multiple layers in several levels one over another, enables the production of hoses of any required length.

Along the course the hose may perform two kinds of movements: either only advancing, or advancing and rotating movements. The simultaneously advancing and rotating movement has been found especially advantageous, because in that case the system of letting off the structural elements used for manufacturing can be placed on fixed stands. With a system enabling advancing movement only, the let off unit has to rotate around the axis of the hose.

Figure 1:
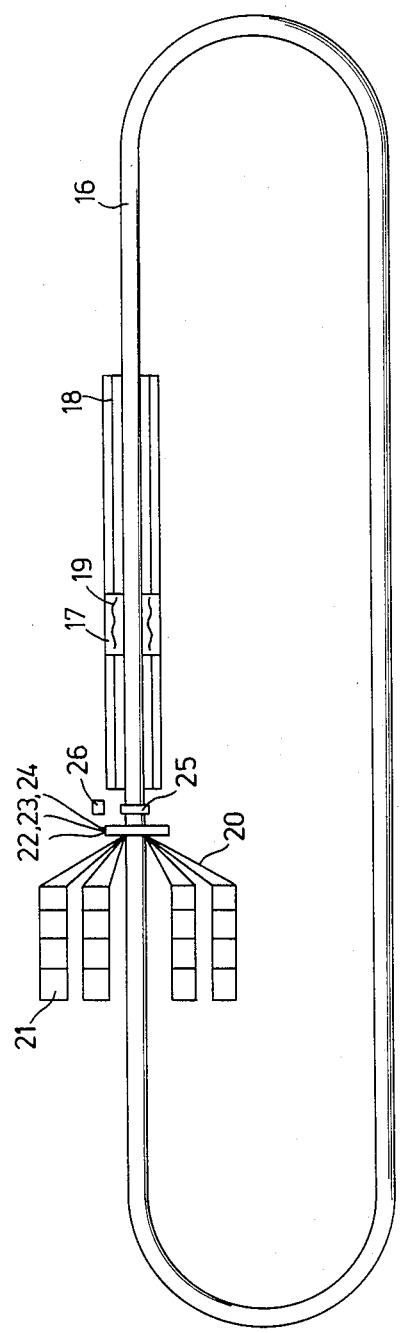
FIG. 1 is a schematic plan view of the curved course and base or foundation forming the internal structure of the hose made according to the process of this invention.

Referring now to the drawings which are only illustrative of typical means to carry out the process claimed herein, the numerals therein indicate the following: 16 is the core or foundation base of the hose which is lead along an elongated course; 17 is the driving mechanism; 18 is the rail track; 19 is a gripping means of the driving mechanism; 20 are reinforcing threads; 21 is a platform set of the unwinding system; 22 is a thread aligner; 23 is a thread brake; 24 is a preforming disc; 25 is a press mechanism; 26 is a fixing ply guiding unit; 27 are rollers which support the base; 28 is an axis; 29 are grooved discs; 30 is a rubber endless belt; 32 is an axle; 33 is a fixing mechanism; 35 are pressing rollers; 36 is a counter-weight; 37 is an electric current source;

The following is a description of the process of the invention with reference to the drawings.

Figure 2:
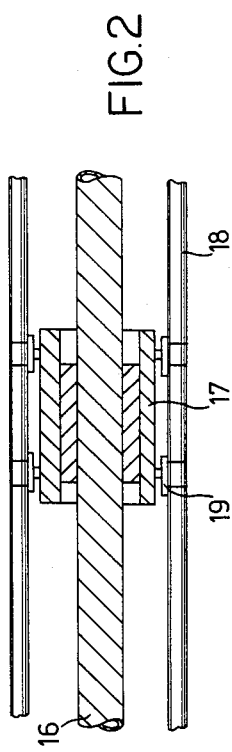
FIG. 2 is a sectional view showing how the foundation is supported on the track, i.e. the hose driving mechanism.

In FIGS. 1 and 2 a hose base 16 is led along a properly elongated "0" shaped track. The two ends of the track can be joined but an empty section between them is permitted. The base 16 is led along the lane by properly designed and located supplementary support means. The driving mechanisms 17 move back and forth on rails 18. The length of rails 18 is much shorter than the length of the core. At the first section of the rail track a gripping means 19 of the driving mechanism 17 grips the base 16 and starts to move towards the opposite end of the rail track 18 so that meanwhile the gripping means 19 rotates. As a result of that advancing and rotating motion of the base, reinforcing threads 20 are twisted around the surface of the base 16 in a defined angle and alignment from a platform set 21 of the unwinding system by means of an aligner 22, a thread brake 23, preformer discs 24 and a press mechanism 25. The base 16, while being rotated and advanced along the track, behaves as a bended helical spring. The pressed and drawn threads alternate in accordance with the number of revolutions. The driving mechanism 17 stops at the end of the track of rails 18. The gripping means 19 disengages from holding the base already covered with reinforcement and the driving mechanism 17 moves with open gripping means 19 back to the beginning part of track rail 18 for the next advancing operation. This sequence of alternating steps are repeated until base 16 is totally covered with reinforcing plies.

Figure 5:
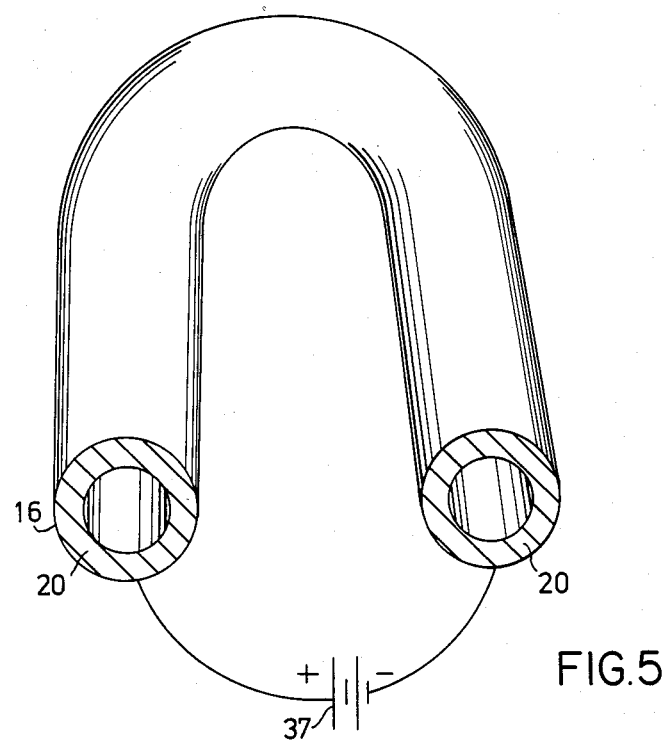
FIG. 5 shows schematically a means of supplying electrical current to the reinforcing plies of the built-up hose.

While the base 16 is released, the wound up reinforcing threads would loosen around the surface of the base 16. Therefore simultaneously with applying the reinforcing threads but with another pitch a fixing ply is applied to and wound around the surface of the base 16 through the fixing ply guiding unit 26 so that said fixing ply is positioned over the reinforcing threads and it fixes them tight. The fixing ply is applied immediately behind the thread-aligner 22 and pressing mechanism 25. The hoses are cured along the advance track by electric resistance heating by connecting to both ends of the hose a power supply 37 as shown in FIG. 5. The power supply 37 is connected to the reinforcing plies 20 which are metal threads or filaments. The threads act as resistors and become heated, thus internally heating the hose. This results in minimal loss of heat and good adhesion between the plies.

Figure 3:
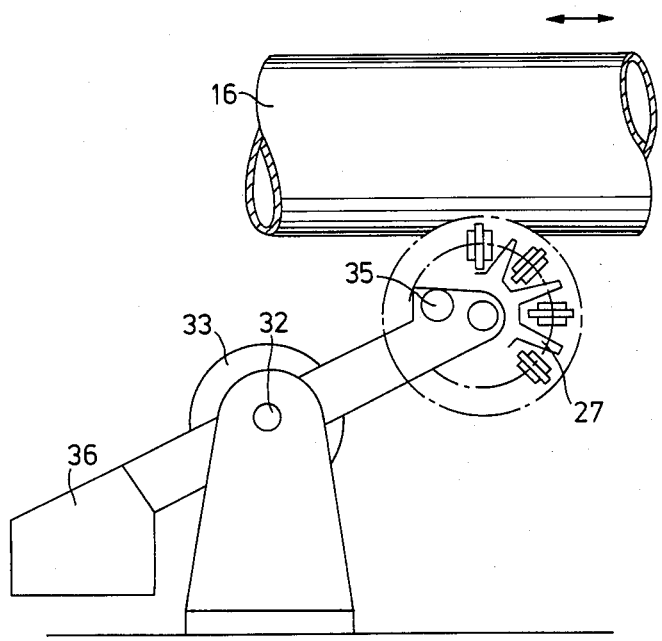
FIG. 3 is a hose supporting means in side-view.
Figure 4:
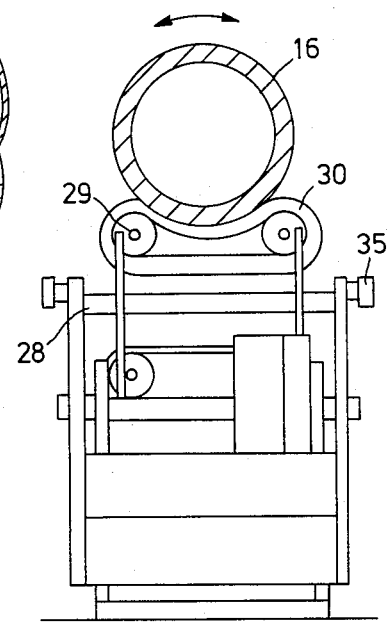
FIG. 4 is a hose supporting means viewed from a perpendicular direction to the axis of the built-up hose.

A support means for the base 16 is shown in FIGS. 3 and 4. The base 16 which is advanced forward and rotated simultaneously is supported by rollers 27 which allow movement in two directions. An axis 28 and grooved discs 29 having side bearings support endless rubber belts 30 which are stretched in unloaded conditions. The distance between the sidewalls of the rollers 27 can be adjusted. The roller 27 can swing along an axle 32 by means of a lifter and the torque generated by the weight of the hose is taken up by a fixing mechanism 33. When the driving mechanism 17 moves near the roller 27, a switch releases the fixing mechanism 33. Releasing of the mechanism 33 can be activated also by auxiliary energy. Then, the master track 18 of the driving mechanism 17 presses down the roller 27 by pressing rollers 35. When the driving mechanism 17 has already passed, the roller 27 is lifted by the counter-weight 36 up to the level of the base 16 and then the fixing mechanism 33 receives a controlling impulse and the immediate position is fixed. Weight of the counter-weight 26 is able to lift up the roller 27 safely while the base will not be deformed.

DETAILED DESCRIPTION

For moving the hose along the course, depending on the length and on the shape of the course as well as on the strength characteristics of the hose foundation, at least one, but generally more, means have to be arranged so as to provide the necessary pull-force for the moving of the hose, and, to the extent the hose also accomplishes rotating movements, for providing the torque required, respectively. The number of these moving means has to be defined in a manner, that the hose should not be damaged due to high-pull-force and torque transmission. It is obvious, that the more spots on which the force and torque transmission takes place the less their value is at each single spot. Thereby, the load of the hose structure may be kept within a moderate range.

The means which serve to support the hose along the course should be situated in a manner that the inflection of the hose on each of such supports should not be more than 180°, measured between the tangents of the spots of ingress and egress of each. Supporting means, for example, wheels provided with rollers (rollers having two dimensions) which enable both advancing and rotating movements of the hose, are placed along the circumference perpendicular to the plane of the wheels.

The the manufacture of the hoses can be carried out on or along a strip wound steel pipe, also necessary for other reasons, or onto a prevulcanized foundation forming the internal structure of the hose. A flexible mandrel can also be used for the hose manufacturing process according to this invention. This is due to the fact that the bending radius of the course can be increased to the required extent, a manipulation which was not provided for in the known prior art processes which use drums for hose manufacture.

As mentioned above with the known prior art processes the hoses have to be heat-treated and cured, respectively, in boilers having diameters of several meters and this is accompanied with a difficult material handling job and with high energy consumption.

The process according to the present invention provides advantages not only in the hose fabrication, but also in the curing and heat-treating stages, when compared with the prior art processes.

It has been found that a hose led in one single layer along a curved course in accordance with the present invention can extraordinarily advantageously be vulcanized and heat-treated respectively, by applying electric heating. The hoses being made along the curved course can be heated to a suitable temperature and vulcanized by means of electric current connected either onto both ends of the hose or onto shorter sections of same, using the reinforcing plies as resistances. The process according to this invention has the following advantages;

(a) Heat is produced in the interior of the hose, whereby heat loss is minimal. Vulcanization starts in and spreads outwards from the interior. Due to this, the elastomer layer around the reinforcing plies is heated up first, and while getting soft it provides a good filling due to the pressure exercised against the external layer. According to practical experience, as a result of the good filling, the adhesion of the layers is increased greatly when compared with products fabricated conventionally.

(b) The use of electric current for curing purposes is already known per se. No process, however, has so far been known for vulcanization of hoses of large-length with metal reinforcing plies. As an example only, we mention that high-frequency or microwave heating methods could not be applied for such hoses with success, because of the shadowing effect of the metal reinforcing plies. Thus no suitable heating of the tube was able to be performed.

(c) With processes using curing drums, vulcanization carried out by means of electrical energy could not be carried out, because of the inability to provide uniform heating of hoses wound in several layers, as the internal and external situated hose windings were heated differently. When using the process according to the invention, the hose is situated in one layer only and thus, vulcanization by means of electric current can suitably be carried out.

What we claim is:

1. A process for manufacturing a vulcanized large-diameter, large-length hose, comprising applying the component parts, including metal reinforcing plies, required for hose fabrication onto a flexible foundation lead through an advancing or an advancing and rotating movement thereof while conveying the hose along a closed curve track and vulcanizing the fabricated hose by introducing electric current into the internal reinforcing plies of the hose.

2. The process of claim 1, wherein the hose is supported and advanced along said curved course by a plurality of wheel means which cause up to 180° inflection of the hose measured between tangents to the ingress and egress spots on each of said means.

3. The process of claim 1, wherein the hose is advanced along said curved course by more than one power transmitting means suitably arranged along said curved course.

* * * * *